United States Patent [19]

Mezger

[11] Patent Number: 4,956,433
[45] Date of Patent: Sep. 11, 1990

[54] TELECHELIC POLYMERS FROM THIURAM DISULFIDE OR DITHIOCARBAMATES

[75] Inventor: Thomas Mezger, Erlenbach/Main, Fed. Rep. of Germany

[73] Assignee: Akzo N.V., Netherlands

[21] Appl. No.: 271,407

[22] Filed: Nov. 14, 1988

Related U.S. Application Data

[63] Continuation of Ser. No. 25,561, Mar. 13, 1987, abandoned.

[30] Foreign Application Priority Data

Mar. 14, 1986 [DE] Fed. Rep. of Germany ....... 3608556

[51] Int. Cl.$^5$ .................... C08F 36/04; C08F 26/06
[52] U.S. Cl. .................... 526/265; 525/299; 526/220; 526/293; 526/320; 526/329.2; 526/340; 526/346
[58] Field of Search ............... 526/204, 209, 211, 214, 526/220, 265, 293, 320, 329.2, 340, 346

[56] References Cited

U.S. PATENT DOCUMENTS

| | | | |
|---|---|---|---|
| 2,376,350 | 5/1945 | Fryling | 526/220 |
| 2,396,997 | 3/1946 | Fryling | 526/220 |
| 2,813,849 | 11/1957 | Kern | 526/220 |
| 2,861,933 | 11/1958 | Kern | . |
| 4,245,072 | 1/1981 | Uraneck | 526/195 |

FOREIGN PATENT DOCUMENTS

| | | |
|---|---|---|
| 768719 | 12/1971 | Belgium . |
| 0017897 | 10/1980 | European Pat. Off. . |
| 205846 | 12/1986 | European Pat. Off. . |
| 2053209 | 5/1971 | Fed. Rep. of Germany . |
| 2944225 | 5/1981 | Fed. Rep. of Germany . |
| 58-69206 | 4/1983 | Japan . |

OTHER PUBLICATIONS

Makrolekulare Chemie, 183, (1982), pp. 303-317, 2685-2692.
Polymer Bulletin 7, (1982), pp. 197-203.
Makrolekulare Chemie 27, (1958), pp. 142-148.
Journal of the American Chemical Society, 80 (1958), pp. 5927-5929.
Journal of the American Chemical Society, 82 (1960), pp. 1277-80.
Dispersionen Synthetischer Hochpolymere, Part I, by F. Holscher, Springer Verlag Berlin, Heidenberg, New York, 1969, pp. 101-103.
Central Patents Index, 1980, Ref. 68912 C/39.
Chemical Abstracts, vol. 60, 1964, Ref. 14628e.
Die Makromolekulare Chemie 161 (1972), pp. 113-120.
Makromol. Chem., 68, 1963, pp. 216-218.
Department of Chemistry, The University of Birmingham 15, England, Kurzmitteilung; A Tracer Study of the End-Groups in Polystyrene Prepared in the Presence of Tetra-Ethyl Thiuram Disulphide, A. F. Barton and J. C. Bevington (Eingegangen am Sept. 2, 1963, pp. 216-218.
Jozef Beniska, Emil Staudner, and Eugene Spirk, Preparation of Polymers Containing Fragments of N.N'-Tetramethylthiuram Disulfide, Nov. 29, 1971 pp. 113-120.
Article-Hochmolekularbericht 1972; I. Bensika, Die Polymerisation von Vinylmonomeren in Gegenwart von Tetramethylthiuramdisulfid Serie A, Nr. 8, S. 1790-1797, Vysokomol. SOed. 13 (1971).
Article Hochmolekularbericht 1970, E. Staudern, J. Beniska, European Polymer Journal 1969, S.537-544, Polymerisation von Styrol in Gegenwart von Tetramethylthiuramdisulfid.
Makromol Chem., Rapid Commun. 3,127-132 (1982), Role of Initiator-Transfer Agent-Terminator (Iniferter) in Radical Polymerizations: Polymer Design by Organic Disulfides as Iniferters, Takayuki Otsu, Masatoshi Yoshida.
Makromol Chem., Rapid Commun. 3,133-142 (1982), A Model for Living Radical Polymerization, Takayuki Otsu, Masatoshi Yoshida, Toshinori Tazaki.
Makromolekulare Chemie, Rapid Commun. 3, (1982), pp. 765-768.

*Primary Examiner*—Christopher Henderson
*Attorney, Agent, or Firm*—Oliff & Berridge

[57] ABSTRACT

The invention relates to telechelic polymers based on radically polymerized, ethylenically unsaturated monomers which are obtained by polymerization by means of thiuram disulfides and dithiocarbamates, which have one or several additional functional reactive groups in addition to the carbamate group. The invention furthermore relates to the manufacture of the said type of telechelic polymers and to the use thereof, for example, as reactive precursors in higher-polymer linear or crosslinked products, especially as components of aqueous solutions, emulsions, dispersions, and suspensions for the preparation of coatings.

8 Claims, No Drawings

TELECHELIC POLYMERS FROM THIURAM DISULFIDE OR DITHIOCARBAMATES

This is a continuation of application Ser. No. 07/025,561 filed Mar. 13, 1987 now abandonded.

FIELD OF THE INVENTION

The present invention relates to telechelic polymers based on ethylenically unsaturated monomers, radically polymerized with dithiocarbamate compounds as initiators, and to a process for the manufacture thereof, and to uses thereof.

BACKGROUND OF THE INVENTION

Telechelic polymers are polymers with reactive functional groups at the ends of the polymer chains. They generally have relatively low molecular weighte ($\overline{M}_n < 5000$) and in most cases narrow molecular weight distributions; the nonuniformity $\overline{M}_w/\overline{M}_n - 1$ generally ranges from 0 to 3. Telechelic polymers are especially interesting as low-viscosity starting materials for high-molecular-weight linear or cross-linked polymers. However, a broad range of applications for interesting telechelic polymers, for example, those with amino, hydroxy, or carboxyl groups at chain ends, had until now often been precluded by the low economic efficiency of their manufacture.

The end groups of telechelic polymers or their precursors are often formed from constituents of the polymerization initiators employed. Most of the known manufacturing processes demand either high-purity reagents (anionic polymerization, du Pont group-transfer polymerization) or the use of expensive initiators, for example, functionalized azo compounds (cf. BE 768,719).

Also known are processes for the manufacture of telechelic polymers with simple reagents, but these are limited only to a few monomers to be polymerized. For example, the use of hydrogen peroxide as initiator in the manufacture of hydroxytelechelic polymers is limited only to the polymerization of butadiene (Makromolekulare Chemie 183, 303 (1982)) and of acrylates (Makromolekulare Chemie, Rapid Commun. 3, 765 (1982)); Japanese Pat. No. 58 69206, 4/25/83). In this case, complex molecular weight distributions or branched products are also obtained for the most part (Makromolekulare Chemie 183, 2685 (1982)).

Finally, the manufacture of telechelic poly(methyl methacrylates) and polystyrenes by means of simple dithiocarbamate compounds such as tetramethylthiuram disulfide or tetraethylthiuram disulfide as the initiator is also known; this process produces polymers with a dithiocarbamate group at the ends of polymer chains, which is of little interest for broad application (Polymer Bulletin 7, 197 (1982); Makromolekulare Chemie 27, 142 (1958)).

SUMMARY OF THE INVENTION

The present invention therefore has as an object the provision of telechelic polymers on the basis of as many ethylenically unsaturated monomers as possible. These polymers can be manufactured by a highly economic process with a readily controllable molecular weight distribution by means of simple and available polymerization initiators, and have reactive groups at the ends of the polymer chains which are of interest for highly diverse applications.

The above and other objects are achieved with telechelic polymers based on ethylenically unsaturated monomers, radically polymerized by dithiocarbamate initiators, which are characterized by the fact that they are obtained by polymerization with thiuram disulfides and dithiocarbamates, which have one or several additional functional reactive groups in addition to the carbamate group.

DETAILED DESCRIPTION OF PREFERRED EMBODIMENTS OF THE INVENTION

Preferred are telechelic polymers which are obtained by polymerization with dithiocarbamates and thiuram disulfides, which have primary, secondary, and/or tertiary amino groups as well as hydroxy groups, carboxyl groups, and/or carbonyl groups. Preferred dithiocarbamate compounds are those with general formulas (I) and (II):

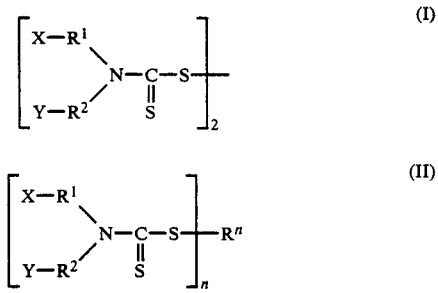

Here, X, Y, $R^1$, $R^2$, $R^n$, and n have the following meaning:

X, Y = H, COOH, $NR^3R^4$, $N^{\oplus}R^3R^4R^5$, $OR^3$,

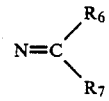

$X \neq H$, when $Y = H$
$Y \neq H$, when $X = H$
$R^1$, $R^2$ = alkylene with 1 to 10 carbon atoms, cycloalkylene with 5 to 10 carbon atoms
$R^3$, $R^4$, $R^5$ = H, alkyl residue with 1 to 18 carbon atoms,

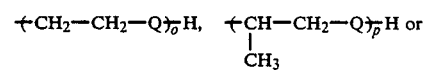

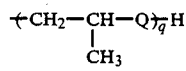

$R^6$, $R^7$ = H, aromatic residue with 6 to 10 carbon atoms, cycloaliphatic residue with 5 to 10 carbon atoms, aliphatic residue with 1 to 6 carbon atoms
$R^6 \neq H$, when $R^7 = H$
$R^7 \neq H$, when $R^6 = H$
Q = O and/or NH
$R^n$ = n-valent organic residue
n = integers from 1 to 4
o, p, q = average numbers from 1 to 80

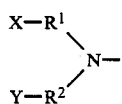

can also form a heterocyclic ring (III)

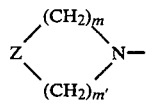
(III)

with
Z=NH, NR¹—X, C=O, CH—W
W=COOH, COOR, OH, R¹OH
and m=integers from 1 to 3
and m'=zero and integers from 1 to 3.

Dithiocarbamates and thiuram disulfides substituted with suitable functional groups are employed as radical formers for the manufacture of the novel telechelic polymers. They have the advantage in that they are odorless, nontoxic, and obtainable from inexpensive raw materials by means of simple processes.

The thiuram disulfides can be obtained, for example, from an appropriately substituted secondary amine and carbon disulfide by oxidative reaction (cf., for example, Published West German Patent Application (DE-OS) 29 44 225), for example, according to the equation

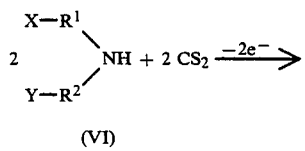
(VI)

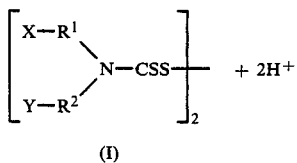
(I)

To manufacture the dithiocarbamates, dithiocarbamate (VII) synthesized as an intermediate also according to reaction (1) is first prepared from the appropriate secondary amine and carbon disulfide and then reacted to form a dithiocarbamate according to standare procedure with a corresponding organic compound with activated chlorine substituents, for example, according to the equation

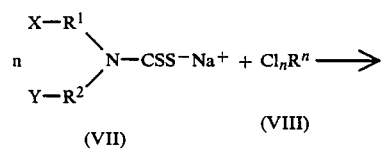
(VII)    (VIII)

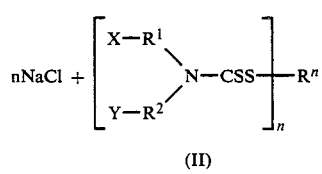
(II)

n=integers from 1 to 4.

Suitable as organic compounds (VIII) which have an activated chlorine substituent and are to be reacted with the dithiocarbamate salt (VII) are preferably those compounds in which the chlorine atom occurs at a methylene group, which has a carbonyl group or a carbon atom of an aromatic ring system at the alpha-position. Of these, preferred as initiators of the invention are those organic chlorine compounds in which the chlorine atom occurs at the methylene group of chloroacetic acid esters or at the methylene group of benzyl compounds. In this case, compounds (IV) and (V) are then formed as the dithiocarbamates to be employed according to the invention.

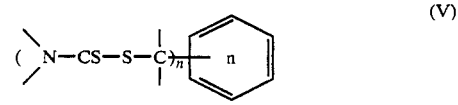
(IV)

n=integers from 1 to 4

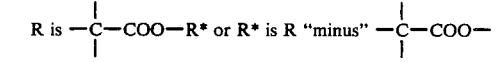
(V)

$R$ is $-\overset{|}{\underset{|}{C}}-COO-R^*$ or $R^*$ is $R$ "minus" $-\overset{|}{\underset{|}{C}}-COO-$ n=integers from 1 to 3.

It is important in using these dithiocarbamates as polymerization initiators that they cleave the radical >N—CSS. under the polymerization conditions with regard to the capacity for repeated activation. A corresponding activation of the methylene carbon bound to a sulfur atom is therefore necessary, as preferably provided in the case of initiators to be used according to the invention by neighboring carbonyl or aromatic carbon atoms. If this is not the case, cleavage of the CS—S bond with formation of a thiocarbamoyl radical >N—CS occurs during the polymerization. Should this type of thiocarbamoyl radical form the polymer end group by recombination, it can no longer be activated, in contrast to the radical >N—CSS., so that chain termination occurs.

Particular example of preferred secondary amines (VI) as starting compounds for the dithiocarbamates (II) to be used according to the invention are those in which R¹ and R² form an alkylene residue with 1 to 3 carbon atoms. Further preferred are those in which X or Y is a hydrogen residue and/or the functional groups OR³, NR³R⁴ or N⊕R³R⁴R⁵ with R³, R⁴ and R⁵=H, and alkyl with 1 to 4 C atoms, for example,

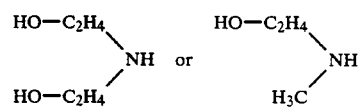

Other examples of amines as constituents of the thiuram disulfides and dithiocarbamates to be used preferentially according to the invention are those in which the amine forms the heterocyclic ring (III)

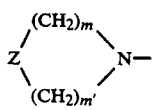

with m, m'=1 to 3, and Z=NH, N—R$^1$OH, N—R$^1$—NH$_2$, N—R$^1$—N=CH—Ar, CH—COOH, and C=O, as, for example,

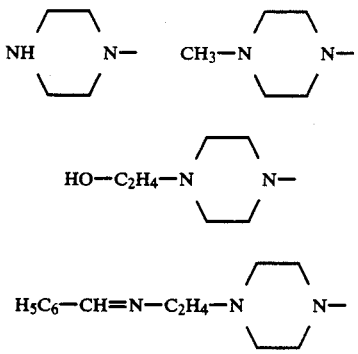

The novel telechelic polymers can be homo- or copolymers or block copolymers, which are obtained by appropriate polymerization of radically polymerizable, ethylenically unsaturated monomers. Preferred novel telechelic polymers are those based on monomers of the general formula

 (IX)

and

 (X)

wherein
A=H, CH$_3$, Cl, COOR, CH$_2$—COOR, CN
B=COOR, CH=CH$_2$, Cl, CN, C$_6$H$_5$, C$_6$H$_4$Cl, substituted aryl, pyridyl, or aromatically heterocyclic residue
R=alkyl residue with 1-12 C atoms, substituted by additional functional groups if necessary.

Especially preferred telechelic polymers are those based on vinyl aromatic compounds, acrylates, and methacrylates. Styrene, p-methylstyrene, p-chlorostyrene, chloromethylstyrene, and/or 2-vinylpyridine are preferably employed as the vinyl aromatic compounds.

Monomers with the general formula (X), for example fumaric acid esters and maleic acid esters, maleic anhydride, and cinnamic acid esters, are espically suitable for copolymers.

Preferred copolymers are those based on styrene or acrylate (acrylates and methacrylates), whereby suitabel comonomers are all of the monomers listed above, which exhibit suitable copolymerizability with styrene or acrylate. Copolymerizability can be easily assessed by comparison of the copolymerization parameter R or the e and Q value according to the e-Q scheme of Alfrey and Price (see, for example, "Dispersionen Synthetischer Hochpolymere" (Dispersions of Synthetic High Polymers), Part I, by F. Holscher, Springer Verlag Berlin, Heidelberg, New York, 1969, pages 102/103). For example, in photoinitiated copolymerization, styrene or acrylate can be suitably polymerized with monomers with a Q value greater than 0.1, preferably greater than 0.2, and especially greater than 0.4.

Especially preferred telechelic copolymers are those obtained from radically polymerized styrene and conjugated dienes.

Another object of the present invention is a process for the manufacture of telechelic polymers by radical polymerization of the corresponding ethylenically unsaturated monomers in the presence of thiuram disulfides and dithiocarbamates, which have one or several additional functional reactive groups in addition to the carbamate group, at temperatures in the range of —50° to 200° C. Temperatures between 70° and 150° C. are preferred, if polymerization is to be induced thermally, and between —10° and 150° C. if polymerization is to be induced photolytically. Thiuram disulfides are known to be both thermal and photolytic reaction starters, whereas dithiocarbamates are predominantly photolytic reaction starters. Thiuram disulfides have a high transfer constant for numerous monomers, which turns out to be advantageous for regulating molecular weight in the sense of relatively low nonuniformities of polymer chains at high conversions.

Thiuram disulfides act not only as initiators in polymerization but also as retarding chain transfer agents; i.e., thiuram disulfides can also react with the radical end of a growing polymer chain, whereby chain termination occurs and a new initiator radical is formed, which, however, adds a new monomer more slowly than the growing polymer chain, whereby polymerization is thus retarded. The polymerization kinetics deviate from simple models for this reason. Initiator fragments are incorporated as end groups into the polymer and are again photolytically cleavable in the presence of monomers. The retardation effect is expressed to various degrees in individual monomers and can be regulated in copolymerization by appropriate selection of comonomers. Transfer reactions are less likely in polymerization initiated with dithiocarbamates.

Because the dithiocarbamate end groups of polymers are again photolytically cleavable into radicals, block copolymerization with addition of other monomers is possible in a second polymerization step.

Telechelic polymers can be produced according to the invention by polymerization both in the presence and absence of an inert solvent. In general, the conversion rate declines in the presence of solvents. The proportion of monomers to be polymerized therefore should be not less than 20 weight %, referred to the reaction mixture.

In the interest of good space/time yields, work preferably proceeds in the absence of a solvent. If the thiuram disulfides and dithiocarbamates are poorly soluble in the monomer(s) to the polymerized, polymerization proceeds at first heterogenerously and then homogeneously as conversion increases.

In case in which the monomers are not totally convertible, polymerization proceeds preferably in the presence of higher proportions of the ethylenically unsaturated monomers to be polymerized than are necessary for the formation of telechelic polymers; i.e., polymerization proceeds until 30 to 90% of the ethylenically unsaturated monomers are converted, and the unconverted monomers are separated from the polymer by extraction by means of a suitable solvent or by distillation, at reduced pressure if necessary. The excess monomer, i.e., the amount of monomer not converted during polymerization, thereby functions simultaneously as the solvent for the resulting telechelic polymers. In this type of polymerization procedure it is beneficial to terminate the polymerization when monomer conversion has slowed down or if free initiator is no longer detectable in the reaction mixture. This polymerization procedure with incomplete conversions of monomers is described, e.g., in Journal of the American Chemical Society, 80 (1958), page 5927 and 82 (1960), page 1277.

Use of solvents cannot be abandoned if the polymerization temperature is preset by boiling at reflux or the heat of polymerization is to be eliminated or if the initiator (thiruam disulfide or dithiocarbamate) must be dissolved. In general, it is sufficient if the initiator is partially dissolved. In order to satisfy the requirements established for the solvent, mixtures of two or more solvents can also be used, for example, mixtures of a solvent to dissolve the initiator and another to establish the polymerization temperature.

Chlorinated hydrocarbons are especially suitable for the basic thiuram disulfides and dithiocarbamates.

In the case of photopolymerization, the solvent is advantageously selected such that the educt and end product are constantly in homogeneous phase. Furthermore, the solvent should not absorb UV light appreciably above 270 nm. One-ring aromatics can be employed.

The telechelic polymers can be advantageously manufactured according to the invention also in the presence of water as the reaction medium, whereby all components of the reaction mixture or only a portion thereof are dissolved in water, but all components may also be present undissolved. If the reaction mixture or a part thereof is insoluble in water, vigorous stirring may suffice and/or suitable emulsifiers or dispersing agents can be added. Suitable emulsifiers, for example, include anionic emulsifiers, such as salts of higher fatty acids or of sulfuric acid esters of fatty alcohols or alkyl phenols or of sulfonates, or cationic emulsifiers such as fatty amines or quaternary fatty ammonium compounds, or nonionic emulsifiers such as partial fatty acid esters of polyalcohols, or ethylene or propylene oxide adducts with fatty acids, fatty alcohols, or fatty amines. Suitable dispersing agents, for example, include water-soluble cellulose derivatives such as carboxymethyl celluloses, or water-soluble polyvinyl compounds such as polyvinyl alcohol, polyvinylpyrrolidone, or poly(meth)acrylic acid or salts thereof.

The polymerization is advantageously carried out according to the invention in the presence of 2 to 30 weight % of initiator, referred to the weight of the ethylenically unsaturated monomers.

Other initiators, for example, peroxide or azo initiators, can be used in addition to thiuram disulfides in the manufacture of the novel telechelic polymers. In this case as well, the dithiocarbamate group is incorporated terminally into the polymers, whereby polymers with fewer (in terms of a statistical average) than two chain ends with dithiocarbamate end groups are possible.

The novel telechelic polymers of the invention have number-average molecular weights between 500 and 20,000. Preferred telechelic polymers are those with number-average molecular weights between 900 and 5000. The molecular weights can be easily adjusted by selection of initiator concentration and polymerization temperature. In general, higher molecular weights are observed with lower initiator concentrations and with the lower temperature.

The novel telechelic polymers of the invention can possess end groups which have more than one additional functional group, which may be the same or different, in addition to the dithiocarbamate group.

These additional functional groups increase solubility in polar solvents and concurrently facilitate the further chemical convertibility of telechelic polymers at the chain ends.

The possibility of introducing more than one additional, but different, functional group at the polymer chain end makes it possible to selectively provide the polymers in question with several desired properties. For example, a telechelic polymer with a chain end

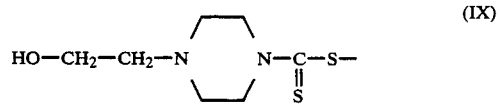

is characterized by a capability for chain elongation by chemical reaction, for example, with the corresponding isocyanates (optionally in the presence of additional compounds with several active hydrogen atoms) and by solubility in aqueous media. Higher solubility can be achieved in the case of the above example by quaternization of the nitrogen atom that is not part of the carbamate group by protonation or reaction with alkylating agents. Thus a telechelic polymer with such end groups, e.g., a polymer based on styrene/butadiene, dissolves as an ammonium salt in dilute acids.

The novel telechelic polymers of the invention are generally linear and accordingly have two functional chain ends. However, telechelic polymers with several chains, e.g., star-shaped polymers, can also be produced according to the invention. This is the case if dithiocarbamates with more than two dithiocarbamate groups are used initially in the manufacture of the telechelic polymers.

Because of the indicated properties, the novel telechelic polymers of the invention are extremely suitable starting substances for the manufacture of the most diverse types of polymers. In this case, different telechelic polymers can react with each other or with other products with appropriate reactive groups, if necessary with the concurrent use of chain elongating agents. The telechelic polymers are especially suitable as low-viscosity starting materials for high-molecular-weight linear or cross-linked polymers. This also refers to the possibility of manufacturing block copolymers from telechelic polymers synthesized by means of thiuram disulfides, whereby the polymers are converted photolytically in the presence of additional suitable ethylenically unsaturated monomers. Such block copolymers can be successfully used as (chip)-impact-resistant coatings or viscoelastic molding materials.

Novel telechelic polymers with functional groups increasing the hydrophilicity at the chain ends can be used in aqueous systems as solutions, emulsions, dispersions, and suspensions. They can be present in the said systems both as unchanged telechelic polymer (e.g., as ionic or zwitterionic surfactants or chelating agents and as a reactive initial product) and also as higher-polymer linear or cross-linked secondary product.

In the further processing of the novel low-molecular-weight telechelic polymers in solutions to form highermolecular-weight polymers, e.g., in coating/painting materials, they offer the major advantage that solutions with a relatively high solid content can be employed at suitable processing viscosities.

Furthermore, the manufacture of coating layers, elastomers, and hardenable casting and compression-molding materials are possible areas of application.

The novel telechelic polymers of the invention are especially interesting as components of caulking compounds, fillers, sealing compounds, and adhesives. Butadiene-containing telechelic polymers are of interest as components of rocket propellant.

The possibility of using the telechelic polymers of the invention as initial products for higher-polymer linear or crosslinked binders in the paints/coatings sector is also especially interesting; this applies especially to aqueous systems. The telechelic polymers are advantageously applied in this case, for example, by electrophoretic deposition.

The telechelic polymers of the invention are also very advantageous in the manufacture of elastomers. For example, those based on styrene-butadiene copolymers with hydroxyl end groups can be reacted with triisocyanates or diisocyanates with chain elongating agents to form permanently flexible shaped pieces.

The inventive telechelic polymers are likewise highly suitable for modification of surfaces, e.g., for the purpose of better wetting by other materials, improving adherence of coating layers, or for improved corrosion protection.

The present invention will not be described in greater detail with reference to the following non-limiting examples. The term "parts" used in the examples is understood to the parts by weight.

EXAMPLE 1

Preparation of bis(4-(2-hydroxyethyl)piperazine-1-thiocarbonyl) disulfane

To a mixture of 32 parts of sodium hydroxide and 104 parts of N-hydroxyethylpiperazine in 1000 parts of water are added dropwise 64 parts of carbon disulfide with ice cooling in such a way that the temperature does not rise above 5° C. Stirring then continues for another 90 minutes, at least until the carbon disulfide has dissolved homogeneously. Then a solution of 262 parts of potassium hexacyanoferrate (III) in 650 parts of water is added over a period of 3 hours. The resulting precipitate is then filtered, washed thoroughly with water and finally with a little alcohol, and then dried in a stream of air at room temperature.

Obtained are 142.5 parts of a yellow, powdery substance, which according to elemental analysis consists of 40.5% C, 6.5% H, 13.4% N, and 30.9% S (calculated: 40.9% C, 6.4% H, 13.6% N, 31.2% S), and which corresponds to the title compound of this Example according to IR, $^1$H-NMR, and mass spectrometry.

Examples 2 to 12 describe the production of telechelic polymers by polymerization with the use of thiuram disulfide synthesized according to Example 1.

EXAMPLE 2

20.5 parts of the thiuram disulfide for Example 1 with 104 parts of freshly distilled styrene are stirred in a weak nitrogen stream for 11 hours at 90° C. After cooling, the reaction mixture is poured into 1 liter of vigorously stirred methanol and filtered; after filtration, 72 parts of a yellowish powder are obtained, which according to gel-permeation-chromatographic separation is a styrene oligomer with an essentially unimodal molecular weight distribution and a polydispersity coefficient $M_w/M_n$ of 2.8. Titration of a solution of the product with perchloric acid gives an amine content of 1 mole/kg, which corresponds to a number average molecular weight of 2000 g/mole.

EXAMPLE 3

198 parts of the thiuram disulfide for Example 1 are stirred with 505 parts of styrene and 622 parts of butyl acrylate (both freshly distilled) under nitrogen and polymerized for 20 hours at 90° C. and for another 6½ hours at 100° C.

The unreacted monomer portions are distilled off in vacuum (2 mm Hg, 80° C.). Obtained are 880 parts of an amber-yellow resin, which is viscous when warm and has a unimodal molecular weight distribution according to gel permeation chromatography. The sulfur content was determined as 6.8%; titration give 1.6% basis nitrogen. The obtained hydroxyl equivalents are calculated to be 1.1 eq/kg.

EXAMPLE 4

41 parts of the thiuram disulfide from Example 1 are combined with 379 parts of butadiene and 104 parts of styrene in an agitating pressure vessel and polymerized for 40 hours at 93° C. After filtration and removal by distillation of the unreacted monomer portions, obtained are 328 parts of an amber-yellow, slightly opaque resin, which is viscous at room temperature, with a viscosity of 91 Pa.s, a content of basic nitrogen of 0.5 eq/kg and a sulfur portion of 3.3%. The gel-permeation-chromatography-elution curve shows an essentially unimodal distribution with a poly-dispersity coefficient of 3.9.

EXAMPLE 5

650 parts of butadiene and 416 parts of styrene are polymerized with 164 parts of the thiuram disulfide from Example 1 in an agitating pressure vessel for 6 hours at 90° C. and for another 2 hours at 115° C. The initial pressure in this case was 9 bar. 662 parts of a clear, amber-colored resin with 1.2 eq/kg of basic nitrogen are obtained.

EXAMPLE 6

606 parts of butadiene and 166 parts of styrene are reacted with 66 parts of the thiuram disulfide according to Example 1 for 42 hours at 90° C. and for 8 hours at 100° C. Pressure in this case drops from 11 to 4 bar (in each case at 90° C.). An insoluble residue of 7 parts remains after filtration. 620 parts of a resin with 0.38 eq/kg of basic nitrogen are obtained.

EXAMPLE 7

130 parts of styrene are placed with 160 parts of butyl acrylate (each being freshly distilled) in a three-neck flask with a funnel, stirrer, and a descending condenser. The mixture is heated to 100° C., and a solution of 50 parts of thiuram disulfide from Example 1 in 1500 parts of chloroform and 12.5 parts of hydroxyethyl acrylate is then added dropwise over a period of 13 hours, while a weak nitrogen stream is passed over the mixture. The internal temperature is maintained at 100° C. so that the chloroform is continuously distilled out of the reaction vessel. After the charging ends, the reaction is permitted to continue for another 6 hours and the monomers are then distilled off in vacuum. 178 parts of a resin remain, which is dissolved in 200 parts of toluene for further purification and again precipitates in 4 liters of low-boiling petroleum ether. After drying, 160 parts of a polymer with 1.6 eq/kg of basic nitrogen and 2.2 eq/kg of hydroxyl groups remain.

EXAMPLE 8

38.4 parts of butyl methacrylate and 1.16 parts of hydroxyethyl acrylate are polymerized with 2.5 parts of the thiuram disulfide from Example 1 under nitrogen at 100° C. for 22 hours. After filtering the solution and distilling off the residual monomers, 22.2 parts of a resin with 0.64 eq/kg of basic nitrogen and 1 eq/kg of hydroxyl groups are obtained. The sulfur content is determined as 1.8%. The gel-permeation-chromatography-elution curve is essentially unimodal.

EXAMPLE 9

90 parts of xylene are placed in a three-neck flask with stirrer, funnel, a column, and a descending condenser, and are heated to the boiling point of xylene in a weak nitrogen stream. Then a mixture of 9.2 parts of the thiuram disulfide from Example 1, 104 parts of styrene, and 300 parts of chloroform are added dropwise over a period of 4 hours, whereby the chloroform continuously distills off. The internal temperature rises gradually from 127° to 145° C. The achieved temperature is maintained for another 30 minutes, and xylene and styrene are then distilled off at reduced pressure. 50 parts of a polymer with 1 eq/kg of basic nitrogen remain. The molecular weight distribution exhibits a shoulder in the oligomer region.

EXAMPLE 10

32 parts of vinyl toluene are polymerized with 5.1 parts of the initiator from Example 1 for 2 hours at 110° C. The initiator is dissolved after 10 min. The residual monomer is distilled off at reduced pressure. There remains 18.8 parts of a polymer with 1.3 equivalents of amine/kg and an essentially unimodal molecular weight distribution.

EXAMPLE 11

34.65 parts of 4-chlorostyrene are polymerized with 5.1 parts of the initiator from Example 1 for 2.5 hours at 110° C. Excess monomer is distilled off at reduced pressure. Obtained are 27.5 parts of a polymer with 0.94 eq of amine/kg.

EXAMPLE 12

26.3 parts of 2-vinylpyridine are polymerized with 5.1 parts of the initiator from Example 1 for 2.5 hours at 110° C.

17.5 parts of a dark polymer with essentially unimodal molecular weight distribution are obtained.

EXAMPLE 13

Block Copolymerization with Methyl Methacrylate and a Polymer According to Example 5

A polymer according to Example 5 consisting of butadiene and styrene at a 3:1 molar ratio, and with a number-average molecular weight of about 3000, is dissolved to 2 parts in 20 parts of methyl methacrylate and irradiated for 8 hours with a mercury high-pressure lamp in a Duran glass vessel. After evaporation of the residual monomer at reduced pressure, 8.8 parts of a polymer remain with a molecular weight distribution shifted into the high-molecular region in comparision with the starting polymer and two glass transition stages in differential thermoanalysis between −45° and −22° C. or 90° and 116° C. The product is soluble in micellar form in acetone (selective solvent for poly(methylmethacrylate)) and gives a hard, shiny, slightly opalescing coating film from butyl acetate.

Examples 14 to 20 describe the preparation of various thiuram disulfides and the application thereof in the production of styrene-based telechelic polymers.

EXAMPLE 14

Bis(4-(2-benzalaminoethyl)piperazine-1-thiocarbonyl) Disulfane 10.6 parts of benzaldehyde are added to a solution of 12.9 parts of 1-(2-aminoethyl)piperazine in 24 parts of water and 24 parts of ethanol. 7.6 parts of carbon disulfide are then slowly added dropwise with ice cooling, whereby a precipitate forms. This is again dissolved after dilution with 100 parts each of water and of ethanol by addition of 10.1 parts of triethylamine and oxidized with 33 parts with potassium hexacyanoferrate(III). The product that now precipitates is filtered, washed repeatedly with water and finally with methanol, and dried at 30° C. in vacuum. Obtained are 26 parts of a substance with 56.4% C, 6.3% H, 14.5% N, and 21.5% S (calculated: 57.5% C, 6.2% H, 14.4% N, 21.9% S), which corresponds to the title compound of this Example according to IR and $^1$H-NMR.

5 parts of this substance are heated with 26 parts of styrene for 2 hours to 110° C., whereby the initiator rapidly goes into solution with formation of a dark-brown product. After distillation at reduced pressure, 12 parts of a dark-brown, solid resin with 2.8 eq/kg of basic nitrogen remain, which dissolves in aqueous acetic acid to an opalescing dispersion with a benzaldehyde odor. The resin has a unimodal molecular weight distribution in gel permeation chromatography with a polydispersity coefficient of 2.5.

EXAMPLE 15

Bis(4-(2-salicylaminoethyl)piperazine-1-thiocarbonyl) disulfane 6.1 parts of salicylaldehyde and 6.4 parts of 1-aminoethylpiperazine are dissolved in 100 parts of a 50/50 water/ethanol mixture and combined with 3.8 parts of carbon disulfide. After oxidation with 16.4 parts of potassium hexacyanoferrate(III), 12.6 parts of a compound with 54.4% C, 6.1% H, 13.6% N, and 19.6% S (calculated: 54.5% C, 5.9% H, 13.6% N, 20.8% S) are obtained.

26 parts of styrene are heated with 5 parts of this substance for 3 hours to 110° C. 16 parts of a polymer, soluble in dilute aqueous acetic acid, with an essentially unimodal molecular weight distribution are obtained after filtration and distillation at reduced pressure.

EXAMPLE 16

Bis(3-carboxylpiperidine-1-thiocarbonyl) disulfane 7.9 parts of piperidine-3-carboxylic acid ethyl ester are added to a solution of 2 parts of sodium hydroxide in 60 ml of water. After addition of 4.2 parts of carbon disulfide and another 2 parts of sodium hydroxide, 16.5 parts of potassium hexacyanoferrate(III) are used for oxidation. After acidification with 1N HCl, a precipitate forms, which becomes crystalline after some time. 7.7 parts of a substance with 41.3% C, 5% H, and 7.3% N (calculated: 41.1% C, 4.9% H and 6.9% N, 31.4% S) are obtained.

1 part of this compound is reacted with 10 parts styrene for 3½ hours at 110° C. Obtained are 4.3 parts of a polymer with unimodal molecular weight distribution, 2.4% sulfur, and 0.24 eq/kg of carboxylic acid groups.

EXAMPLE 17

Bis(4-methylpiperazine-1-thiocarbonyl) disulfane 5 parts of N-methylpiperazine are reacted in 100 parts of water with 2 parts of sodium hydroxide and 4.2 parts of carbon disulfide and oxidized with 16.5 parts of potassium hexacyanoferrate(III). Obtained are 8.6 parts of the compound with 41.1% C, 6.5% H, and 15.7% N (calculated: 41.1% C, 6.3% H, 16.0% N, 36.6% S).

The polymerization of 1 part of this compound with 10 parts of styrene (2 hours, 110° C.) yields 5.6 parts of a polymer with bimodal molecular weight distribution (shoulder in the high-molecular-weight region) with 5.3% S and 0.83 eq/kg of basic amine.

EXAMPLE 18

Bis(4-piperidone-1-thiocarbonyl) disulfane 7.9 parts of 4-piperidone mono-hydrate hydrochloride are reacted with 4 parts of sodium hydroxide and 4.2 parts of carbon disulfide in 100 parts of water and oxidized with potassium hexacyanoferrate(III). Obtained are 8.2 parts of a compound with 40.7% C, 4.6% H, and 7.6% N (calculated: 41.4% C, 4.6% H, 8.0% N, 36.8% S).

2 parts of this compound are polymerized with 20 parts of styrene for 3.5 hours at 110° C. In so doing, 9.9 parts of a polymer with 4.2% sulfur with a distinct carbonyl band at 1730/cm in IR are obtained.

EXAMPLE 19

Thiuram disulfide from piperazine and carbon disulfide 82.3 parts of piperazine are reacted in 350 parts of ethanol with $CO_2$. The precipitate is filtered and dried, then dissolved in 400 parts of water, and combined with 70.3 parts of carbon disulfide with cooling.

The resulting precipitate is again filtered and dried in a stream of air. Obtained are 99.4 parts of a substance with 35.9% C, 6.2% H, 16.8% N, and 33.4/33.6% S. 81.2 parts thereof are dissolved with 20 parts of sodium hydroxide in 600 parts of water and oxidized with 164.6 parts of potassium hexacyanoferrate(III) in an additional 600 parts of water. After filtration and drying, 61.5 parts of a substance extensively soluble in chloroform and aqueous acetic acid with 34.1% C, 5.2% H, 16.0% N, 35.0% S are obtained.

7 parts of this substance are dissolved in 150 parts of chloroform, optionally the insoluble components (1.9 parts) are separated by filtration, and the solution is added steadily dropwise to 52 parts of styrene at 110° C. over a period of 105 minutes. Chloroform is immediately distilled off from the polymerization vessel through a descending condenser. After another 105 minutes at 110° C., the mixture is permitted to cool, and the precipitating insoluble portions (about 0.2 parts) are separated if necessary. The filtrate is freed from excess monomer at reduced pressure. 20.1 parts of a polymer with 0.91 equivalents of amine per kg and with unimodal molecular weight distribution according to gel permeation chromatography remain.

EXAMPLE 20

Thiuram Disulfide from a Piperazine-Ethylene Carbonate Reaction Product and Carbon Disulfide 43 parts of piperazine are dissolved in 250 parts of water and combined with 44 parts of ethylene carbonate melt. After evaporation of the water at reduced pressure, 84 parts of a clear, viscous substance remain. 76 parts thereof are reacted with 74 parts of carbon disulfide in 200 parts of water with ice cooling. The resultant precipitate is again brought into solution by addition of 44.4 parts of triethylamine, and excess carbon disulfide is removed in a reduced pressure, an oily yellow liquid remains. 35 parts thereof are again dissolved in 300 ml of water with addition of another part of triethylamine and oxidized with 32.9 parts of potassium hexacyanoferrate(III) in 200 parts of water. Obtained are 24.5 parts of a substance with 36.2% C, 5.3% H, 11.0% N, and 32.3% S.

2 parts thereof are heated with 20 parts of styrene to 110° C. while stirring. After 90 minutes a clear solution forms, which is left for another 90 minutes at 110° C. The polymer is obtained in the form of 10.9 parts of a pale yellow powder by pouring the solution into a 10-fold amount of methanol; the polymer according to gel permeation chromatography has a unimodal molecular weight distribution with $M_n$ of about 3000 g/mole and $M_w$ of about 9000 g/mole. $M_n$ of 2900 g/mole is calculated from the sulfur content of 4.3%/4.5%. The IR spectrum clearly shows an absorption band at 3500 $cm^{-1}$ (hydroxy) and at 1700 $cm^{-1}$ (urethane-carbonyl).

Examples 21 to 26 describe the preparation of different dithiocarbamates and the application thereof in the production of telechelic polymers.

EXAMPLE 21

Bis(4-(2-hydroxyethyl)piperazine-1-thiocarbonyl)-alpha,alpha'-dithioxylylene

The sodium salt of a 1:1 adduct from N-(2-hydroxyethyl)piperazine and carbon disulfide is dissolved to 45.6 parts in a boiling mixture of 450 parts of methanol and 180 parts of acetone under reflux. A solution of 17.5 parts of p-xylylene dichloride in 90 parts of acetone is slowly added dropwise to this mixture. The mixture is permitted to react for another 2 hours under reflux and the solvent is then distilled off at reduced pressure. The product is washed in water until chloride-free and crystallized from toluene. Obtained are 34.2 g of a compound with the composition: 51.6% C, 6.8% H, 10.8% N, 24.9% S (calculated: 51.3% C, 6.7% H, 10.9% N, 24.9% S).

25 parts of this compound are dissolved with 110 parts of styrene in a mixture of 300 parts of dichloromethane and 45 parts of ethanol while warming. The mixture is irradiated with circulation in a photoreactor with a 100-W mercury high-pressure lamp for 22 hours at 30° C. After filtration and evaporation, the polymer is precipitated with methanol and washed thoroughly and repeatedly with methanol. The combined wash liquids contain 5 parts of a compound, which according to gel-permeation-chromatography-elution volume and the IR spectrum is identical to the thiuram disulfide from Example 1. 27 parts of a polymer are obtained with a molecular weight of 1650 (number average, vapor-pressure osmosis), 6.8% sulfur, and 0.7 eq/kg of basic amine.

1.3 parts of the dithiocarbamate from this example are dissolved in 28 parts of dichloromethane and irradiated after addition of 9.3 parts of itaconic acid diethyl ester for 24 hours with a 100-W mercury high-pressure lamp. Thereafter the signal of the initiator disappears in the gel-permeation-chromatography-elution curve and that of the polymer appears in addition to a low-molecular-weight compound, which is probably identical to the thiuram disulfide from Example 1. The product is isolated by precipitation in petroleum ether and 5.1 parts of a substance, which according to preparative gel permeation chromatography consists up to 80% of polymer with 0.25 eq/kg of basic nitrogen, are obtained.

EXAMPLE 22

Bis(dihydroxyethyldithiocarbamoyl)-p-xylylene 16 parts of sodium hydroxide are dissolved in 225 parts of ethanol, mixed with 42 parts of diethanolamine, and combined with 32 parts of carbon disulfide within a period of 45 minutes. After 1 hour, the mixture is warmed to 70° C. and 35 parts of xylylene dichloride, dissolved in 320 parts of toluene, are added dropwise. The reaction temperature is maintained for another 2 hours, whereby about 23 parts of sodium chloride separate out. After the solvent is distilled off at reduced pressure, 94 parts of a brown oil remain with the composition 47.5% C, 6.4% H, 6.5% N, and 26.9% S (calculated: 46.5% C, 6.1% H, 6.0% N, and 27.6% S). Preparative gel permeation chromatography shows the presence of about 50% of the title compound of this Example in addition to various fragmentation products. The title compound crystallizes after prolonged standing.

20.7 parts of the oily crude product are irradiated with 110 parts of styrene in 308 parts of dichloromethane and 27 parts of ethanol in a circulating photoreactor for 22 hours. Thereafter, the gel-permeation-chromatography elution curve shows the total decomposition of the initiator. After the precipitated components are separated, the solution is evaporated at reduced pressure and precipitated in methanol. Obtained are 30 g of a polymer with a molecular weight of 2200 (vapor-pressure osmosis), 5.7% sulfur, and 2 eq of hydroxyl groups/kg.

EXAMPLE 23

Bis(methyl-2-hydroxyethyldithiocarbamoyl)-p-xylylene 48.5 parts of sodium-(N-methyl-N-2-hydroxyethyl)-dithiocarbamate are dissolved in 320 parts of methanol and 180 parts of acetone under warm conditions. A solution of 24.5 parts of p-xylylene dichloride in 135 parts of acetone is added to it dropwise under reflux. The solution is filtered after 2 hours, whereby 14 parts of sodium chloride are separated. The solution is evaporated and the product is crystallized from toluene. Obtained are 35.2 parts of a substance with 47.7% C, 6.1% H, 6.8% N, 31.5% S (calculated: 47.5% C, 6.0% H, 6.9% N, 31.8% S).

19.5 parts of this compound are dissolved in a mixture of 280 parts of dichloromethane and 70 parts of ethanol under warm conditions, 110 parts of styrene are added, and the mixture is polymerized in a circulating photoreactor at 25° C. for 24 hours.

After evaporation and precipitation in methanol, obtained are 38 parts of a polymer with 7.3% sulfur, an osmotically determined molecular weight of about 2000 g/mole, and 0.7 eq/kg of hydroxyl group.

EXAMPLE 24

Bis(4-methylpiperazinyl-1-thiocarbonyl)dithioxylylene 4 parts of NaOH are dissolved in 90 parts of ethanol, 10 parts of N-methylpiperazine are added, and 7.6 parts of carbon disulfide are slowly added dropwise. The mixture is heated to boiling under reflux and 8.75 parts of xylylene dichloride are added dropwise. After 2 hours the precipitate is filtered; the mixture is thoroughly washed with water to remove sodium chloride and dried at 50° C. in vacuum. Obtained are 18.7 parts of a compound with 52.7% C, 6.8% H, 12.2% N, and 27.8% S (calculated: 52.8% C, 6.7% H, 12.3% N, 28.2% S).

2.3 parts of the obtained compound are dissolved in 28 parts of dichloromethane, combined with 10.4 parts of styrene, and irradiated for 42 hours with a 100-W mercury high-pressure lamp. The solution is filtered, evaporated, and precipitated in methanol. 6.7 parts of a polymer with 0.9 eq/kg of basic nitrogen remain.

EXAMPLE 25

Ethylene glycol-bis-N-piperazinylthiocarbonylthioacetic Acid Ester 192 parts of piperazine are partially dissolved in 500 parts of water. 22.8 parts of carbon disulfide are added dropwise over a period of 1½ hours, whereby the piperazine sediment dissolves. After an hour, the solution is evaporated to dryness. The sediment is thoroughly washed with ethanol to remove excess piperazine, and 58 parts of the piperazinium salt of piperazinyldithiocarboxylate are obtained. Analysis gives the composition 43.6% C, 8.1% H, 22.2% N, 26.0% S (calculated: 43.6% C, 8.1% H, 22.6% N, 25.8% S).

12.5 parts of this substance are dissolved with 2 parts of sodium hydroxide in 100 ml of ethanol and slowly combined with 5.4 parts of ethylene glycol-bis-chloroacetic acid ester at 0° C. After 1 hour, the formed precipitate is separated (2.4 parts of sodium chloride); the filtrate is evaporated at reduced pressure, picked up in chloroform, and extracted repeatedly with water. After the chloroform is evaporated, 8.7 parts of an initially waxy substance with the composition 41.3% C, 6.5% H, 11.4% N, 26.2% S (calculated: 41.2% C, 5.6% H, 12.0% N, 27.5% S) remain.

1.5 parts of this compound are dissolved with 4.5 parts each of styrene and of methyl methacrylate in 22.5 parts of chloroform and polymerized by UV irradiation (100-W mercury high-pressure lamp) for 18 hours. After evaporation of volatile components at reduced pressure, the mixture is washed with methanol, and 3.4 g of a polymer with 3.5% sulfur and 0.4 eq/kg of basic nitrogen are obtained.

EXAMPLE 26

Trimethylolpropane-tris-N-piperazinyl-thiocarbonyl Thioacetic Acid Ester 8.2 parts of the 2:1 adduct from piperazine and carbon disulfide (cf. Example 25, Part 1) are dissolved with 1.6 parts of sodium hydroxide in 90 parts of ethanol. 4.7 parts of trimethylolpropane-tris(chloroacetate) are then added at 0° C. After standing for several hours at room temperature, the mixture is filtered off (residue of 2.2 parts of sodium chloride), evaporated, picked up in chloroform, and repeatedly extracted with water; the chloroform is drawn off at reduced pressure. 8.1 parts of yellow, oily liquid remain, which becomes crystalline after addition of petroleum ether. After filtration and drying, 7.8 parts of a compound with 43.6% C, 6.6% H, 11.4% N, and 25.6% S (calculated: 43.8% C, 6.0% H, 11.3% N, 26.0% S) remain.

4 parts of this compound are neutralized with acetic acid and dissolved in 320 parts of water. After addition of 45 parts of styrene, the mixture is irradiated in a circulating photoreactor for 20 hours at room temperature. An emulsion forms along with one coagulated polymer, which breaks by heating to the boiling point. The water is then decanted and the residue is treated with methanol. After drying, 24 parts of a polymer with 2% sulfur remain.

Examples 27 to 30 relate to applications of the novel telechelic polymers.

EXAMPLE 27

82 parts of a telechelic polymer made of butadiene and styrene according to Example 6 are freed from volatile components with 3.12 parts of N-phenyldiisopropanolamine for 1 hour at 100° C. while stirring at 2 mm Hg, and then permitted to cool to 80° C. 5.35 parts of bis-1,4-isocyanatocyclohexane are melted on with further mixing. After brief degassing in vacuum, the mixture is poured into preheated aluminum forms coated with a release agent and permitted to harden for 24 hours under dry nitrogen at 100° C.

The resulting elastomer has an elongation at break of 549% at a tear strength of 4.3 N/mm². Permanent elongation of 50% is determined after 5 extensions to 300%. The relaxation-to-stress strength ratio at 200% elongation is 75% after the 4th load change.

EXAMPLE 28

22 parts of the polymer from Example 5 are dissolved with 5 parts of methyl ethyl ketone and neutralized with 2.5 parts of lactic acid. 150 parts of demineralized water is added while stirring vigorously. A milky aqueous dispersion of the polymer is obtained, which does not sediment even after several months. A degreased iron sheet, which is connected to the negative pole of a voltage source, and a corresponding counter-electrode for electrophoretic deposition are immersed in the dispersion. When a voltage of 145 V is supplied, an almost current-impermeable coating film is deposited after a minute on the sheet functioning as cathode; the film is rinsed with demineralized water and then baked for 30 min at 180° C. A brown, hard coating layer, 18 μm thick, is obtained.

EXAMPLE 29

To produce a 2-component acrylic resin lacquer, 18.3 parts of the polymer according to Example 3 are dissolved with 8 parts of toluene, and combined well with 7.8 parts of Desmodur N 75 (TM —a product of Bayer AG, Leverkusen, Germany, which consists essentially of a trimer of hexamethylene diisocyanate). Lacquer films are applied to degreased iron sheets with a film-drawing device. After 24 hours at room temperature, a film with 74 sec Koenig pendulum hardness forms, which cannot be detached with a small cloth moistened with methyl isobutyl ketone even after 100 rubbing motions. A film baked for 2 hours at 100° C. has a Koenig pendulum hardness of 157 sec.

EXAMPLE 30

To produce a 2-component acrylic resin lacquer, 15 parts of a resin according to Example 7 are dissolved in 5 parts each of xylene and of butylacetate and combined with 5.85 parts of Desmodur N 75. Layers of 100 μm are applied with a film-drawing device to a degreased iron sheet, zinc phosphate sheet, hot-galvanized sheet, and aluminum sheet. Films of 139 sec Koenig pendulum hardness are obtained after 24 hours of drying at room temperature or 165 sec of Koenig pendulum hardness after a week of drying. Films baked at 100° C. for 1 hour have a hardness of 171 sec. They exhibit good adherence for all substrates (grid test: 0), no cracks in the mandrel bending test, and excellent resistance to xylene, naphtha, and methyl isobutyl ketone.

What is claimed is:

1. Telechelic polymers based on ethylenically unsaturated monomers selected from the group of formulas consisting of

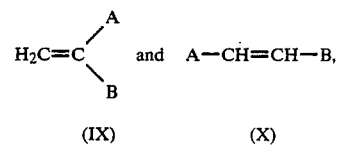

wherein
A=H, CH₃, Cl, CN, COOR, CH₂—COOR
B=COOR, CH=CH₂, Cl, CN, C₆H₅, C₆H₄Cl, p-methyl-phenyl chloromethyl or pyridyl,
R=alkyl residue with 1–12 C atoms,
radically polymerized by dithiocarbamate initiators, said telechelic polymers having been formed by polymerization with at least one initiator selected from the group consisting of thiuram disulfides and dithiocarbamates which have at least one additional reactive functional group in addition to a carbamate group, wherein said additional reactive functional group is at least one of amino groups, hydroxy groups, carboxyl groups and carbonyl groups.

2. Telechelic polymers according to claim 1, wherein said thiuram disulfides and dithiocarbamates have the formulas (I) and (II):

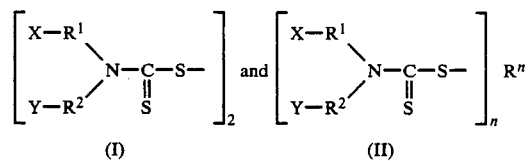

wherein
X, Y=H, COOH, NR³R⁴, N⊕R³R⁴R⁵, OH,

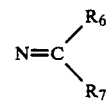

X≠H, when Y=H
Y≠H, when X=H
R¹, R²=alkylene with 1 to 10 carbon atoms, cycloalkylene with 5 to 10 carbon atoms,
R³, R⁴, R⁵=H, alkyl residue with 1 to 18 carbon atoms, $R^6$, $R^7$=H, aromatic residue with 6 to 10 carbon atoms, cycloaliphatic residue with 5 to 10 carbon atoms, aliphatic residue with 1 to 6 carbon atoms $R^6 \neq H$, when $R^7 = H$ $R^7 \neq H$, when $R^6 = H$ $R^n$=n-valent organic residue with up to n methylene group(s), which are found in the alpha-position relative to a carbonyl group or to a carbon atom of an aromatic ring system, and wherein the organic residue $R^n$ is bound to the dithiocarbamate sulfur atom via such a methylene group according to formula (II)

n=integers from 1 to 3 or in which the group

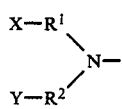

forms a heterocyclic ring (III)

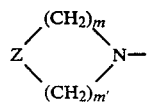 (III)

with

Z=NH, $NR^1$—X, C=O, CH—W

W=COOH, COOR, OH, $R^1$OH m=integers from 1 to 3 m'=zero and integers from 1 to 3.

3. Telechelic polymers according to claim 2, wherein $R^1$ and $R^2$ signify an alkylene residue with 1 to 3 carbon atoms.

4. Telechelic polymers according to claim 2, wherein X or Y forms at least one of a hydrogen residue and the functional groups OH, $NR^3R^4$ and $N^{\oplus}R^3R^4R^5$ with $R^3$, $R^4$ and $R^5$=H and alkyl with 1 to 4 carbon atoms.

5. Telechelic polymers according to claim 2, said telechelic polymers having been formed by polymerization with thiuram disulfides of the formula (I), in which the group X-$R^1$-N-$R^2$-Y forms the heterocyclic ring (III) with m and m'=2, Z=NH or $NR^1$X with X=OH, $NH_2$, and N=CH-Ar, and $R^1$ and $R^2$=alkylene residues with 1 to 3 carbon atoms.

6. Telechelic polymers according to claim 1, wherein said ethylenically unsaturated monomers are selected from the group consisting of vinyl aromatic compounds, acrylates and methacrylates.

7. Telechelic polymers according to claim 6, wherein the vinyl aromatic compounds are selected from the group consisting of styrene, p-methyl-styrene, p-chlorostyrene, chloromethylstyrene, and 2-vinylpyridine.

8. Telechelic polymers according to claim 1, wherein said ethylenically unsaturated monomers are selected from the group consisting of styrene and conjugated dienes.

* * * * *

UNITED STATES PATENT AND TRADEMARK OFFICE
CERTIFICATE OF CORRECTION

PATENT NO. : 4,956,433
DATED : September 11, 1990
INVENTOR(S) : Thomas MEZGER

It is certified that error appears in the above-identified patent and that said Letters Patent is hereby corrected as shown below:

```
Column 1, line 18, change "weighte" to --weights--;
          line 26, change "had" to --has--.
Column 3, line 50, change "standare" to --standard--.
Column 4, line 30, delete in its entirety.
Column 5, line 59, change "bel" to --ble--.
Column 6, line 56, change "the" to --be--;
          line 59, change "case" to --cases--.
Column 9, line 31, change "not" to --now--;
          line 34, change "the" to --be--.
Column 18, Claim 1, line 32, change "chloromethyl" to
     --chloromethyl-phenyl--.
```

Signed and Sealed this

Seventh Day of January, 1992

Attest:

HARRY F. MANBECK, JR.

*Attesting Officer*     *Commissioner of Patents and Trademarks*